US012440472B2

(12) United States Patent
Bilal et al.

(10) Patent No.: US 12,440,472 B2
(45) **Date of Patent: *Oct. 14, 2025**

(54) STABLE TRYPTAMINE ORAL FILMS

(71) Applicant: INTELGENX CORP., St-Laurent (CA)

(72) Inventors: Mobarik Bilal, Blainville (CA); Nadine Paiement, St-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,372

(22) Filed: Jun. 16, 2022

(65) Prior Publication Data

US 2022/0409584 A1 Dec. 29, 2022

Related U.S. Application Data

(60) Provisional application No. 63/211,401, filed on Jun. 16, 2021.

(51) Int. Cl.

| | |
|---|---|
| ***A61K 31/4045*** | (2006.01) |
| ***A61K 9/00*** | (2006.01) |
| ***A61K 9/70*** | (2006.01) |
| ***A61K 31/675*** | (2006.01) |
| ***A61K 47/02*** | (2006.01) |
| ***A61K 47/10*** | (2017.01) |
| ***A61K 47/18*** | (2017.01) |
| ***A61K 47/22*** | (2006.01) |
| ***A61K 47/26*** | (2006.01) |
| ***A61K 47/32*** | (2006.01) |
| ***A61K 47/38*** | (2006.01) |

(52) U.S. Cl.

CPC ........ *A61K 31/4045* (2013.01); *A61K 9/0056* (2013.01); *A61K 9/70* (2013.01); *A61K 31/675* (2013.01); *A61K 47/02* (2013.01); *A61K 47/10* (2013.01); *A61K 47/186* (2013.01); *A61K 47/22* (2013.01); *A61K 47/26* (2013.01); *A61K 47/32* (2013.01); *A61K 47/38* (2013.01)

(58) Field of Classification Search

CPC .................................................... A61K 9/0056

See application file for complete search history.

(56) References Cited

U.S. PATENT DOCUMENTS

| | | | | |
|---|---|---|---|---|
| 4,695,463 | A | 9/1987 | Yang et al. | |
| 6,660,292 | B2 | 12/2003 | Zerbe et al. | |
| 7,132,113 | B2 | 11/2006 | Zerbe et al. | |
| 7,674,479 | B2 | 3/2010 | Zerbe et al. | |
| 8,691,272 | B2 | 4/2014 | Zerbe et al. | |
| 8,703,191 | B2 | 4/2014 | Zerbe et al. | |
| 8,735,374 | B2 | 5/2014 | Zerbe et al. | |
| 9,301,948 | B2 | 4/2016 | Zerbe et al. | |
| 9,668,970 | B2 | 6/2017 | Obeid et al. | |
| 9,717,682 | B2 | 8/2017 | Zerbe et al. | |
| 9,949,934 | B1 | 4/2018 | Zerbe et al. | |
| 10,272,038 | B2 | 4/2019 | Obeid et al. | |
| 10,610,528 | B2 | 4/2020 | Zerbe et al. | |
| 10,722,476 | B2 | 7/2020 | Zerbe et al. | |
| 10,828,254 | B2 | 11/2020 | Paiement et al. | |
| 11,033,493 | B2 | 6/2021 | Obeid et al. | |
| 11,471,406 | B2 | 10/2022 | Paiement et al. | |
| 11,602,504 | B2 | 3/2023 | Madwar et al. | |
| 11,648,212 | B2 | 5/2023 | Bilal et al. | |
| 2004/0131661 | A1* | 7/2004 | Auffret | A61K 8/733 424/443 |
| 2007/0053939 | A1* | 3/2007 | Yokoyama | A61K 47/36 514/635 |
| 2007/0190139 | A1 | 8/2007 | Zerbe et al. | |
| 2009/0214640 | A1 | 8/2009 | Szabo et al. | |
| 2011/0136815 | A1 | 6/2011 | Zerbe et al. | |
| 2011/0263606 | A1 | 10/2011 | Zerbe et al. | |
| 2012/0141585 | A1 | 6/2012 | Coulter | |
| 2014/0065217 | A1 | 3/2014 | Zerbe et al. | |
| 2014/0155483 | A1 | 6/2014 | Li et al. | |
| 2016/0051510 | A1 | 2/2016 | Allen | |
| 2016/0074396 | A1 | 3/2016 | Jeon | |
| 2016/0220480 | A1 | 8/2016 | Bilal et al. | |
| 2016/0243036 | A1 | 8/2016 | Paiement et al. | |
| 2016/0324773 | A1 | 11/2016 | Paiement et al. | |
| 2017/0216220 | A1 | 8/2017 | Bilal et al. | |
| 2017/0258710 | A1 | 9/2017 | Conway et al. | |
| 2017/0290807 | A1 | 10/2017 | Mundada | |
| 2017/0290870 | A1 | 10/2017 | Schaneville | |
| 2017/0304319 | A1 | 10/2017 | Westrin | |
| 2018/0078549 | A1 | 3/2018 | Zerbe et al. | |
| 2018/0110724 | A1 | 4/2018 | Zerbe et al. | |
| 2018/0250240 | A1 | 9/2018 | Paiement et al. | |
| 2019/0091281 | A1* | 3/2019 | Wargacki | A61K 9/006 |
| 2019/0133925 | A1 | 5/2019 | Paiement et al. | |
| 2019/0209459 | A1 | 7/2019 | Obeid et al. | |
| 2019/0231685 | A1 | 8/2019 | Paiement et al. | |

(Continued)

FOREIGN PATENT DOCUMENTS

| | | |
|---|---|---|
| CA | 2535803 | 3/2005 |
| CA | 3017264 | 9/2017 |

(Continued)

OTHER PUBLICATIONS

Hallucinogens: LSD, Peyote, Psilocybin, and PCP National Institute on Drug Abuse (Year: 2008).*

Unidirectional drug release from 3D printed mucoadhesive buccal films using FDM technology: In vitro and ex vivo evaluation Eleftheriados et al. European Journal of Pharmaceutics and Biopharmaceutics 144 (2019) 180-192 (Year: 2019).*

DARK Classics in Chemical Neuroscience: Psilocybin Geiger et al. ACS Chem. Neurosci. 2018, 9, 2438-2447 (Year: 2018).*

Venkateswarlu et al., "Preparation and Evaluation of Fast Dissolving Buccal Thin Films of Bufotenin", iMedPub Journals (Dec. 5, 2016), vol. 2, No. 4:12.

Morepen Active Ingredients, retrieved from the Internet at http://morepen.com/api-product-information.htm on Dec. 31, 2019. (Year 2019).

Baliga, S., et al., J. Indian Soc Periodontol, 17(4): 461-465 (2013).

Khatoon, N., et al., International Journal of Pharmaceutical Sciences and Research, 5: 1780-1787 (2014).

(Continued)

*Primary Examiner* — Jeffrey S Lundgren

*Assistant Examiner* — Eric Tran

(74) *Attorney, Agent, or Firm* — Anglehart et al.

(57) ABSTRACT

Pharmaceutical compositions with tryptamines having enhanced active stability properties are described.

18 Claims, 2 Drawing Sheets

(56) References Cited

U.S. PATENT DOCUMENTS

| | | | |
|---|---|---|---|
| 2019/0247505 | A1 | 8/2019 | Paiement et al. |
| 2019/0290595 | A1 | 9/2019 | Zerbe et al. |
| 2019/0314293 | A1 | 10/2019 | Bilal et al. |
| 2020/0138730 | A1* | 5/2020 | Madwar ............... A61K 36/185 |
| 2020/0138885 | A1 | 5/2020 | Paiement et al. |
| 2020/0215063 | A1 | 7/2020 | Zerbe et al. |
| 2021/0015738 | A1* | 1/2021 | LaRosa .............. A61K 31/4045 |
| 2021/0036310 | A1 | 2/2021 | Hou et al. |
| 2021/0316347 | A1 | 10/2021 | Klöckner |
| 2021/0393611 | A1 | 12/2021 | Madwar et al. |
| 2022/0362164 | A1 | 11/2022 | Paiement et al. |
| 2022/0395452 | A1 | 12/2022 | Paiement et al. |
| 2023/0047314 | A1 | 2/2023 | Paiement et al. |
| 2023/0201130 | A1 | 6/2023 | Madwar et al. |
| 2023/0225965 | A1 | 7/2023 | Tir et al. |
| 2023/0248660 | A1 | 8/2023 | Bilal et al. |

FOREIGN PATENT DOCUMENTS

| | | | |
|---|---|---|---|
| CA | 3067822 | | 12/2018 |
| CA | 3017526 | A1 | 3/2020 |
| WO | 2008038155 | A2 | 4/2008 |
| WO | 2012121461 | A1 | 9/2012 |
| WO | 2013107810 | A1 | 7/2013 |
| WO | 2016134454 | A1 | 9/2016 |
| WO | 2018176149 | A1 | 10/2018 |
| WO | 2018205017 | A1 | 11/2018 |
| WO | 2020051709 | A1 | 3/2020 |
| WO | 2022165607 | A1 | 8/2022 |
| WO | 2022170442 | A1 | 8/2022 |

OTHER PUBLICATIONS

The Dow Chemical Company, 2002 (Year: 2002).

López-Olaondo et al. (British Journal of Anaesthesia, 1996, 76, 835-840).

Hughes, L. “Ion exchange resinates—the technology behind the mystery” 2005, Pharmaceutical Technology Europe, 17 (4), 38-42.

Balakrishnan, P., et al. Enhanced oral bioavailability of Coenzyme Q10 by self-emulsifying drug delivery systems. International Journal of Pharmaceutics, (2009), 374(1-2), 66-72.

Vieira, E. et al., Evaluation of Brewer’s spent yeast to produce flavor enhancer nucleotides: influence of serial repitching. Aug. 20, 2013, Journal of Agricultural and Food Chemistry, vol. 61, 8724-8729.

English Translation of WO2012121461A1, published Sep. 13, 2012. Machine Translation.

Vishvakarma, “Design and development of montelukast sodium fast dissolving films for better therapeutic efficacy”, Journal of the Chilean Chemical Society, 63(2), pp. 3988-3993, Jun. 1, 2018 (Jun. 1, 2018).

* cited by examiner

STABLE TRYPTAMINE ORAL FILMS

CROSS-REFERENCE TO RELATED APPLICATIONS

The present application claims priority to U.S. Provisional Patent Application No. 63/211,401, which was filed on Jun. 16, 2021, and is hereby incorporated by reference in its entirety.

FIELD OF THE DISCLOSURE

This disclosure relates to oral film dosage formulations and processes for preparing oral film dosage forms, and more particularly to the preparation of oral film dosage forms containing tryptamines, and preferably psilocybin, psilocin, norpsilocin, bufotenin, bufotenidine, baeocystin, norbaeocystin, and aeruginascin, and salts thereof, and combinations thereof, and more particularly to films with a stability mechanism for the active agent(s).

BACKGROUND OF THE DISCLOSURE

Film type oral dosage forms are often preferred by subjects that have difficulty swallowing tablets or capsules.

Due to the innovative nature of oral films, there are specific challenges in the technology including an effective dosage, a good mouth feel and taste, a stable yet soluble formula and a reasonable shelf life.

Currently, there is a need for pharmaceutical film formulations having improved stability and shelf life. There is also a need for an improved bioavailability of less potent and less bioavailable active ingredients which allows the less potent active ingredients to be used at effective doses. Additionally, with various pharmaceutical formulations, there is a need for an increased penetration and crossing of the mucosa layer by active ingredients, thereby allowing active ingredients to enter into systemic circulation.

Oral films with tryptamine have recently been disclosed in the art as in US20210015738A1 LaRosa, T., et al., 21 Jan. 2021 (21-01-2021) and in Vankateswarlu, K., Journal of In Silico & In Vitro Pharmacology, 2; 4:12, 5 Dec. 2016 (05-12-2016). Larosa et al. disclose a psilocybin or derivative-containing film with a polymer matrix, and Vankateswarlu et al. disclose preparation of films containing bufotenin. The first fails to teach or disclose a stable tryptamine oral film or a way of achieving high stability during the preparation of the film. The second reveals inconsistent results focusing only on Bufotenin, demonstrating only one batch of good stability with gross variation in film disintegration time. The present disclosure will teach a novel tryptamine oral film that mitigates the shortcoming of the disclosed prior art.

SUMMARY OF THE DISCLOSURE

In certain embodiments, the psilocybin analogues and combinations thereof provided herein include any compound that is structurally related to psilocybin and functionally mimics and/or antagonizes the action of serotonin.

In certain embodiments of the inventive oral dissolvable film, psilocybin and psilocybin analogues and combinations thereof may be derived synthetically or bioengineered; or extracted from naturally occurring mushrooms that have been well described in the art.

In one aspect of the disclosure, phosphoric acid or other inorganic acids or a combination thereof can be added to the psilocybin film oral dosage forms disclosed herein in amounts effective to adjust the pH within a range of from 1.5 to 5.0, with a suitable amount being, for example, 0.5% to 15% or 1% to 10% based on the weight of the film on a dry basis.

In one aspect of the disclosure, the oral dissolvable film employs an acidifying agent is selected from phosphoric acid, citric acid, tartaric acid, malic acid, acetic acid, succinic acid, maleic acid, hydrochloric acid, benzoic acid, fumaric acid, glucoronic acid, or lactic acid, oxalic acid and sulfurous acid.

In one embodiment, the ratio of acidifying agent to psilocybin is between 0.5 to 2.0.

In one embodiment, the acidifying agent is phosphoric acid.

In one embodiment, the oral dissolvable film comprises less than 5 ppm of any of the following EDTA, BHT, propyl gallate, vitamin E or copper, sodium sulphite, sodium bisulphite, sodium thiosulphate, sodium formaldehyde sulfoxylate, sulphur dioxide, ascorbic acid, gallic acid, propyl gallate, isoascorbic acid, thioglycerol, thioglycolic acid, cysteine hydrochloride, acetylcysteine, butylated hydroxy toluene, butylated hydroxy anisole, alpha tocopherols, lecithin, ascorbyl palmitate or nordihydroguaiaretic acid or any derivative or combination thereof.

In certain embodiments, the oral dissolvable film can include a polymeric matrix.

In one aspect of the disclosure, the active agent is present in an amount of from about 2 to 25% by weight or about 5 to 20% by weight, relative to the total dry weight of the oral dissolvable film.

In one aspect of the disclosure, the oral dissolvable film comprises a plasticizer.

In one aspect of the disclosure, the plasticizer is present in an amount up to 25% by weight, such as from 0.5% to 25%, 1% to 20%, 2% to 15% or 5% to 10% by weight, relative to the total dry weight of the oral dissolvable film.

In one aspect of the disclosure, the plasticizer is glycerin.

In one aspect of the disclosure, the oral dissolvable film further comprises a flavor.

In one aspect of the disclosure, the oral dissolvable film further comprises a flavor enhancer.

In one aspect of the disclosure, the oral dissolvable film further comprises a pore former.

In one aspect of the disclosure, the pore former is D-Maltitol.

In one aspect of the disclosure, the oral dissolvable film further comprises film former polymers which may be selected from but not limited to copovidone and hypromellose.

In one aspect of the disclosure, the film forming polymer or combination of film forming polymers is present in an amount of from 10% to 90% by weight, 20% to 80% by weight, or 30% to 70% by weight, relative to the total dry weight of the oral dissolvable films.

In one embodiment, a flowable water-soluble or water swellable film-forming matrix includes less than 5 ppm of stabilizers that do not include inorganic acids.

In one aspect of the disclosure, the oral dissolvable film further comprises a preservative agent.

In one aspect of the disclosure, the oral dissolvable film further comprises a sweetener.

In one aspect of the disclosure, the sweetener is sucralose.

In one aspect of the disclosure, a method is disclosed for treating depression, anxiety, migraines, addiction, dementias, Alzheimer's disease, eating disorders, obsessive compulsive disorder, Lyme disease syndrome, post-traumatic stress disorder, abuse disorders including opioid addiction, alcohol addiction, nicotine addiction, cannabinoid addiction, headache, central nervous system inflammation, and disorders of cognition and memory with the disclosed oral dissolvable film containing psilocybin and derivatives thereof, wherein the method comprises administrating the oral dissolvable film buccally.

In one aspect of the disclosure, a method is disclosed comprising orally administering to a subject an oral dissolvable film comprising (i) a flowable water-soluble or water-swellable film-forming matrix that includes at least one polymer, (ii) psilocybin, psilocin, baeocystin, or a combination thereof; and (iii) a stabilizing inorganic acid; wherein, the psilocybin, psilocin, baeocystin, or combination thereof is present in a combined amount of 0.01 to 5 mg.

According to one aspect of the disclosure, the oral dissolvable film comprises a protective backing layer to further increase the local concentration at the membrane interface and minimize ionization of the active agent due to the local pH environment within the oral cavity.

The disclosure also encompasses pharmaceutical compositions comprising at least one cannabinoid in combination with psilocybin and/or/psilocin, preferably formulated into pharmaceutical dosage forms, together with suitable pharmaceutically acceptable carriers, such as diluents, fillers, salts, buffers, stabilizers, solubilizers, etc. The dosage form may contain other pharmaceutically acceptable excipients for modifying conditions such as pH, osmolarity, taste, viscosity, sterility, lipophilicity, solubility etc. The choice of diluents, carriers or excipients will depend on the desired dosage form, which may in turn be dependent on the intended oral route of administration to a patient.

In one aspect of the disclosure, the oral dissolvable film exhibits a high stability such that the degradation level % of the psychedelic compound remains in specification of the oral dissolvable film, under accelerated stability conditions of a 40° C., relative humidity (RH) 75±5%, over a period of time of 3 months.

In another aspect of the disclosure, the oral dissolvable film of any one of the above embodiments, exhibiting a high stability such that the degradation level % of the psychedelic compound remains in specification of the oral dissolvable film, under accelerated stability conditions of a 30° C., relative humidity (RH) 75±5%, over a period of time of 12 months.

In yet another aspect of the disclosure, the oral dissolvable film of any one of the above embodiments, exhibiting a high stability such that the degradation level % of the psychedelic compound remains in specification of the oral dissolvable film, under accelerated stability conditions of a 25° C., relative humidity (RH) 60±5%, over a period of time of 24 months.

Other aspects, embodiments and features will be apparent from the following description, the drawings and the claims.

DETAILED DESCRIPTION

Figure 1:
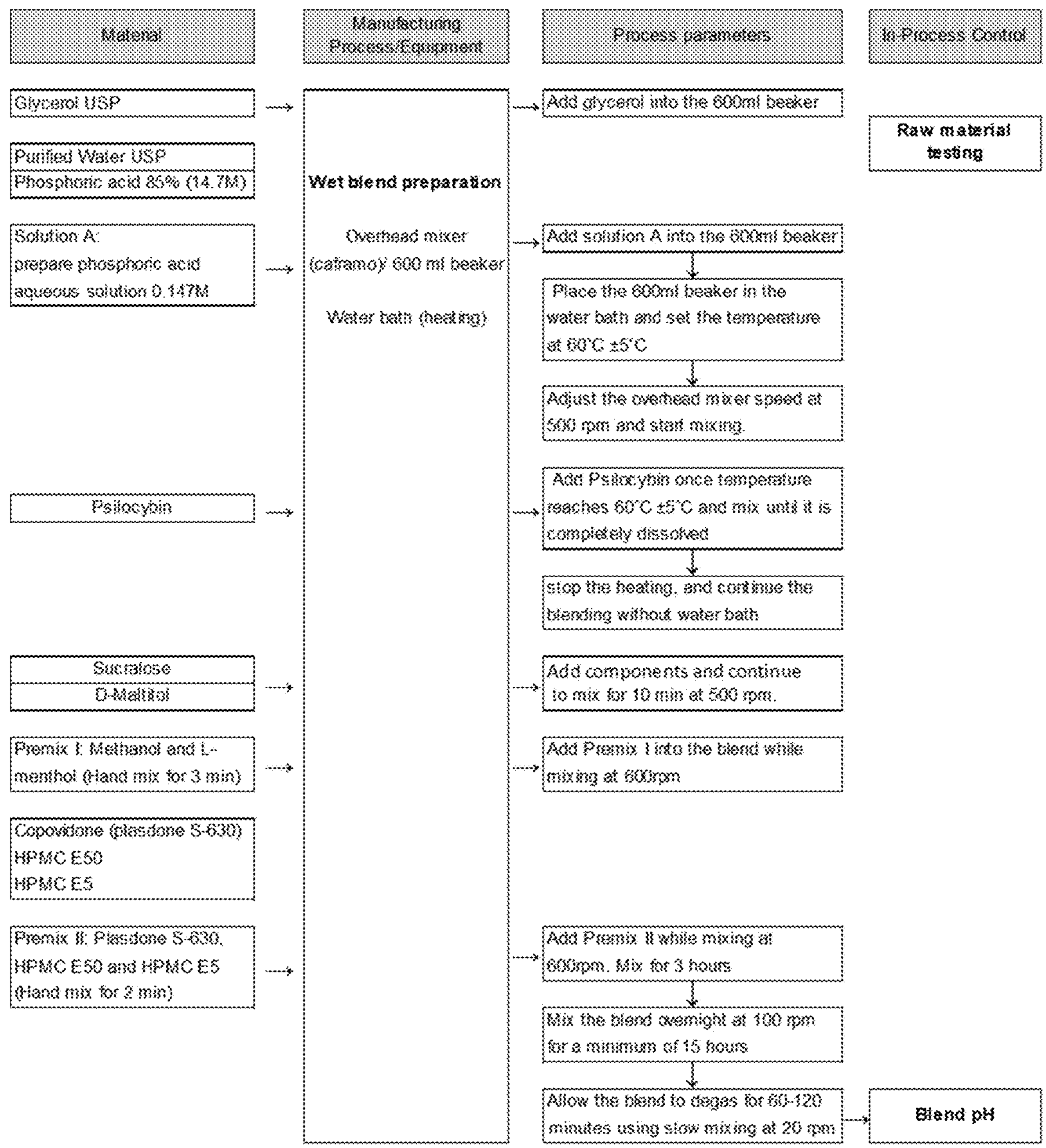
Referring to FIG. 1, the flow chart demonstrates the process of coating, drying and packaging for psilocybin sublingual films.

Unless defined otherwise, all technical and scientific terms used herein have the same meaning as commonly understood by one of ordinary skill in the art.

It is to be understood that this invention is not limited to particular embodiments described, as such may, of course, vary. It is also to be understood that the terminology used herein is for the purpose of describing particular embodiments only, and is not intended to be limiting, since the scope of this invention will be limited only by the appended claims.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The term "about" as used herein can allow for a degree of variability in a value or range, for example, within 10%, within 5%, or within 1% of a stated value or of a stated limit of a range. When a range or a list of sequential values is given, unless otherwise specified any value within the range or any value between the given sequential values is also disclosed.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Film systems embody a field of technology that has major advantages in areas of administering various actives to an individual in need thereof. The present invention relates to oral films and methods for forming film products that include at least one active. Specifically, the invention provides for a film and a method of forming a film that improves the stability of a given active. The terms "oral dissolving film," "oral dissolvable film", "oral disintegrating film", OSF, "oral soluble film", "ODF", "oral chewable film", "OCF", "oral oral dissolvable film", "OTF," "oral drug strip" or "oral strip" refer to a product used to administer a predetermined amount of active ingredient(s) via oral administration such as oral transmucosal absorption, sublingual delivery or buccal delivery and will be referred to throughout as oral dissolvable film(s).

The term "film", "oral dissolvable film" and variations referenced above refers to a type of dosage form that is distinctly different from pills, tablets, caplets, and capsules, and in which the dosage form is a thin strip of material. It will be understood that the term "film" and variations referenced above includes delivery systems of any thickness, including films, film strips, discs, wafers, sheets, and the like, in any shape. Such films are typically rapidly disintegrating or rapidly dissolving, but can also exhibit longer disintegration times when required. The films are generally sufficiently flexible to allow bending or even folding without breaking. For example, the films typically have length and width dimensions on the order of 5 to 35 mm, although larger or smaller dimensions are possible and may be desirable in particular circumstances, and a thickness on the order of 5 to 300 μm, although larger or smaller thicknesses are possible and may be desirable in certain circumstances.

Any number of active agents or active pharmaceutical ingredients may be included in the films discussed herein. The term "active(s)" or "active agent(s)" refers mainly to active pharmaceutical ingredients (APIs), but may also refer generally to any agent(s) that chemically interacts with the subject to which it is administered to cause a biological change, such as, but not limited to, eliminating symptoms of disease or regulating biological functions. The term "Pharmaceutical Ingredient or API" and variations thereof generally refers to any agent that is being administered orally to a subject and includes pharmaceutically active agents, nutraceutically active agents, and breath freshening agents. Examples of pharmaceutically active agents include ACE-inhibitors, antianginal drugs, anti-arrhythmics, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, anti-tumor drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplastics, anti-parkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies such as sildenafil citrate, tadalafil, and vardenafil, fertility agents, gastrointestinal agents, homeopathic remedies, hormones, hypercalcemia and hypocalcemia management agents, immunomodulators, immunosuppressives, anti-migraine preparations such as rizatriptan, eletriptan and zolmitriptan, motion sickness treatments, muscle relaxants, obesity management agents, osteoporosis preparations, oxytocics, parasympatholytics, parasympathomimetics, prostaglandins, psychotherapeutic agents, psychedelics, respiratory agents, sedatives such as lorazepam or diazepam, smoking cessation aids such as bromocryptine or nicotine, sympatholytics, tremor preparations, urinary tract agents, vasodilators, laxatives, antacids, ion exchange resins, anti-pyretics, appetite suppressants, expectorants, anti-anxiety agents such as alprazolam, anti-ulcer agents, anti-inflammatory substances, coronary dilators, cerebral dilators, peripheral vasodilators, psycho-tropics, stimulants, anti-hypertensive drugs, vasoconstrictors, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spadmodics, terine relaxants, anti-obesity drugs, erythropoietic drugs, anti-astmatics, cough suppressants, mucolytics, DNA and genetic modifying drugs, and combinations thereof. Examples of nutraceutically active agents include various dietary supplements, vitamins, minerals, herbs and nutrients.

A variety of additives that can be integrated into the films may provide a variety of different functions. Examples of classes of additives include excipients, lubricants, buffering agents, stabilizers, blowing agents, pigments, coloring agents, fillers, bulking agents, sweetening agents, flavoring agents, fragrances, release modifiers, adjuvants, plasticizers, flow accelerators, mold release agents, polyols, granulating agents, diluents, binders, buffers, absorbents, glidants, adhesives, anti-adherents, acidulants, softeners, resins, demulcents, solvents, surfactants, emulsifiers, elastomers and mixtures thereof. These additives may be added along with the active ingredient(s).

"Acidifying stabilizer" refers to an acid that is added to the oral dissolvable film to stabilize or help stabilize the formulation. In this disclosure, an acid is distinguished from other traditional stabilizers, and antioxidants, such as but not limited to EDTA, BHT, propyl gallate, vitamin E or copper, sodium sulphite, sodium bisulphite, sodium thiosulphate, sodium formaldehyde sulfoxylate, sulphur dioxide, ascorbic acid, gallic acid, propyl gallate, isoascorbic acid, thioglycerol, thioglycolic acid, cysteine hydrochloride, acetylcysteine, butylated hydroxy toluene, butylated hydroxy anisole, alpha tocopherols, lecithin, ascorbyl palmitate or nordihydroguaiaretic acid or any derivative or combination thereof.

"Preservative" refers to an agent that extends the storage life of food and non-food products by retarding or preventing deterioration of flavor, odor, color, texture, appearance, nutritive value, or safety. A preservative need not provide a lethal, irreversible action resulting in partial or complete microbial cell destruction or incapacitation. Sterilants, sanitizers, disinfectants, sporicides, viracides and tuberculocidal agents provide such an irreversible mode of action, sometimes referred to as "bactericidal" action. In contrast, a preservative can provide an inhibitory or bacteriostatic action that is reversible, in that the target microbes can resume multiplication if the preservative is removed. The principal differences between a preservative and a sanitizer primarily involve mode of action (a preservative prevents growth rather than killing microorganisms) and exposure time (a preservative has days to months to act whereas a sanitizer has at most a few minutes to act). In specific embodiments, the preservative includes at least one of sodium benzoate, methyl paraben, propyl paraben, and sodium sorbate.

The term "plasticizer" as used herein refers to a substance that produces or promotes plasticity and flexibility and to reduce brittleness. Plasticizers can be advantageously employed in the film formulations as needed to suitably modify the flexibility of the film to facilitate processing and allow the film to easily conform to the shape of the oral mucosa to which the film is applied. Plasticizers may reduce the glass-transition temperature of the film forming polymers (e.g., the water soluble polymer or water soluble polymers in the film). The plasticizer increases the flexibility, enhances elasticity and reduces brittleness of the film. Examples of plasticizers that can be used in the disclosed oral film dosage forms include triacetin, triethyl citrate, tributyl citrate, acetyl tributyl citrate, acetyl triethyl citrate, trioctyl citrate, acetyl trioctyl citrate, trihexyl citrate, dibutyl sebacate, PEG 300, PEG 400, Glycerine, etc. Plasticizer may be added in an amount up to 25%, alone or as a combination, of the total mass of the film oral dosage form, such as from 0.5% to 25%, 1% to 20%, 2% to 15% or 5% to 10%.

The term "flavoring agent" or "flavor" and variations thereof generally refers to compounds that particularly enhance certain tastes or reduce undesirable flavors without having an especially strong taste of their own. They harmonize taste components and make food/drug preparations more palatable. Examples include but are not limited to L-menthol USP, maltol, ethyl maltol and monosodium glutamate, glutamic acid, glutamates, purine-5-ribonucleotides, inosine, guanosine, adenosine 5_-monophosphates, carboxylic acids (e.g., citric, malic, and tartaric), common salt (NaCl), amino acids, some amino acid derivatives (e.g., monosodium glutamate—MSG), and spices (e.g., peppers) are most often employed, yeast, yeast extract, dried yeast and others or mixtures thereof.

The term "sweetener" and variations thereof generally refers to a solid or liquid ingredient that is used to impart a sweet taste to food or drug product. Sweeteners are often classified as either nutritive (caloric) or non-nutritive (non-caloric), natural or synthetic. Examples of sweeteners include but are not limited to sucrose, dextrose, lactose, glucose, advantame, sorbitol, mannitol, liquid glucose, honey molasses, saccharin, sucralose, rebaudioside A stevia, rebaudioside M stevia, stevioside, mogroside IV, mogroside V, alitame, saccharin, neohesperidin dihydrochalcone, cyclamate, neotame, N-[3_(3-hydroxy-4-methoxybenzyl yl)propyl]-L-α-aspartyl]-L-phenylalanine 1-methyl ester, N-[3-(3-hydroxy-4-methoxyphenyl)-3-methylbutanyl]-L-α-aspartyl]-L-phenylalanine 1-methyl ester, N-[3-(3-methoxy-4-hydroxyphenyl) propyl]-L-α-aspartyl]-L-phenylalanine 1-methyl ester, curculin, cyclamate, aspartame, acesulfame potassium and others or mixtures thereof.

The term "film forming polymer" refers to a polymer used in a film, affecting mechanical proprieties as elasticity, foldability and malleability. Examples of film forming polymers are copovidone (plasdone) and hypromelose HPMC E50.

The term "pore former" as used herein are agents that aid, promote or speed up the disintegration time of the film in the oral cavity. A pore former is an agent that quickly dissolves on the surface of the film, creating holes which allow water to enter the film and thus promote film dissolution and/or disintegration.

The term "penetration enhancer" as used herein refers to a substance that can improve the permeability of the active agent through the mucosa and into the bloodstream of the subject. Penetration enhancers result in buccal penetration enhancement, and result from agents being able to (a) increase the partitioning of drugs into the buccal epithelium, (b) extract (and not disrupt) intercellular lipids, (c) interact with epithelial protein domains, and/or (d) increase the retention of drugs at the buccal mucosal surface. Examples of penetration enhancers are benzalkonium chloride, cetylpyridinium chloride, cetrimide and other quaternary ammonium salts.

Preferred film dosage forms include sublingual and buccal film oral dosage forms. Buccal and/or sublingual mucosa absorption allows the drug to be absorbed directly into the blood stream skipping the hepatic metabolism. From a pharmaceutical formulation perspective this is particularly challenging, as the process of transmucosal permeation needs to be carefully optimized to obtain an acceptable pharmacokinetic profile. Tryptamines such as but not limited to psilocybin, and psilocin are more preferably administered bucally to reduce the incidence of first past metabolism when ingested enterally. The use of a long lasting oral film allowing the dissolving film to direct the active through the mucosa directly to the blood stream is desired to improve the absorption profile of the API and consequently improve bioavailability. The convenience of an oral film over tablets allows better patient compliance, as many individuals have difficulty swallowing or might not have water readily available.

The term "cannabinoid" represents a group of C21 terpenophenolic compounds found uniquely in *Cannabis* plants. Cannabinoids include the psychoactive compounds Δ9-tetrahydrocannabinol (THC), Δ8-THC, cannabinol (CBN), 11-hydroxy Δ9-THC, anandamide, and the non-psychoactive compounds cannabidiol (CBD), cannabichromene, and (−) Δ8-THC-11-oic acid. The term cannabinoid is used herein to refer to a cannabinoid that is either synthetic or extracted from the plant. It is also used to refer to a single cannabinoid or mixture of cannabinoids. The term "*Cannabis*" is used to refer to plants of the genus *Cannabis*, including *Cannabis sativa* and *Cannabis indica.*

The term "mucoadhesive" and variations thereof generally refers to film matrix or pharmaceutical dosage form interacting by means of adhesion with the mucus that covers epithelia. The term "mucoadhesive film former" refers to polymers that form the film matrix, film strip, film sheet and dissolves in aqueous environment and gives bio-adhesive properties to the mucosa examples comprising PEO, Pullulan, CMC, HPC, HPMC and exclude ethyl cellulose (EC), polyvinyl alcohol (PVA), Starch, Polymethacrylate polymers. Examples of mucoadhesive materials that can be used to prepare the mucoadhesive particles include poly(ethylene oxide), polyvinyl pyrrolidone, poly(acrylic acid) derivatives (e.g., commercially available Carbopol®), polycarbophil, polyoxyalkylene ethers, polymethacrylates, polymethacrylates-based copolymers (e.g., commercially available Eudragit®), biodegradable polymers such as poly(D,L-lactide-co-glycolide) (e.g., commercially available Resomer®), anionic biopolymers such as hyaluronic acid, or sodium carboxymethylcellulose, cationic biopolymers such as chitosan or poly(L-lysine) and other cellulose derivatives. Other mucoadhesive polymers that can be used include methyl vinyl ether-maleic acid, a mixed salt of sodium/calcium methyl vinyl ether-maleic acid, methyl vinyl ether-maleic anhydride, and half esters (monoethyl; monobutyl and isopropyl ester) of methyl vinyl ether-maleic anhydride copolymers (e.g., commercially available Gantrez®).

The "surface pH" is the pH measured on a surface of the film, such as the top or bottom surface of a monolayer film or on an exposed surface of the layer containing the active in a multilayer oral film. The film is prepared for pH testing by slightly wetting the film (adding water as needed for a pH test—e.g. one to three drops). The pH is then measured by bringing the electrode in contact with the surface of the oral film. This measurement of the surface pH is preferably performed on several films of the same formulation.

The term "rapidly disintegrating" and variations thereof generally refers to the ability of the film dosage forms to break up into submicron particles or completely dissolve within an acceptable period of time (e.g., within 60 seconds, within 45 seconds, within 30 seconds, within 20 seconds, or within 15 seconds of being administered, i.e., placed in the oral cavity of a subject).

The term "surfactant" refers to dispersing or wetting agents helping the film to dissolve in a short time and release the API quickly. Examples include poloxamer 407, sodium lauryl sulfate, and polysorbate The terms "blend" or "blending media" and variations thereof generally refers to the combination of the OF formulation with the presence of solvents.

The term "drug absorption" or "absorption" as used in this specification, refers to the process of movement from the site of administration of a drug toward the systemic circulation, e.g., into the bloodstream of a subject.

The term "residence time" as used in the specification refers to the time taken by the film to disintegrate on the buccal mucosa.

The disclosed psilocybin dosage forms are formulated as orally administered films comprising psilocybin, or psilocybin analogs disposed within or on a polymeric film suitable for oral administration. The oral dissolvable films can be formulated for rapid disintegration and distribution of microscopic or nanoscopic particles of the active agent in the gastrointestinal tract or as mucoadhesive films that facilitate rapid absorption of psilocybin via oral mucosal tissue, i.e., buccal or sublingual film dosage forms. The oral dissolvable films can also be formulated to have a longer residence time if desired based on various factors including the active agent being employed in a given formulation.

The term "treating", "treat" or "treatment" as used herein embraces both preventative, i.e., prophylactic, and palliative treatment, i.e., relieve, alleviate, or slow the progression of the patient's disease, disorder or condition. The term "treat" or "treatment" as used in this specification in the context of a mental health disorder such as addiction, depression, anxiety and posttraumatic stress disorder (PTSD) refers to any treatment of a disorder or disease associated with a mental health disorder, such as preventing the disorder or disease from occurring in a subject which may be predisposed to the disorder or disease, but has not yet been diagnosed as having the disorder or disease; inhibiting the disorder or disease, e.g., arresting the development of the disorder or disease, relieving the disorder or disease, causing regression of the disorder or disease, relieving a condition caused by the disease or disorder, or stopping the symptoms of the disease or disorder. "Treat" as used herein also refers to treatment of obsessive compulsive disorder (OCD), pain, irritability, fibromyalgia, post-traumatic stress disorder (PTSD), cluster headaches, paranoia, psychosis, anxiety, panic attacks, flashbacks, smoking addiction, alcohol addiction, and cocaine addiction. Thus, as used herein, the term "treat" is used synonymously with the term "prevent", and is not limited by the examples given herein.

The buccal or sublingual film dosage form can comprise a single film layer, or multiple layers. In some embodiments, a bilayer or multilayer film would include a mucoadhesive layer containing the API which is placed against the oral mucosa and a second layer directed outwards from the mucosa serving as a protective barrier against abrasion from the tongue or mastication or simply against constant washing of the saliva. This protective layer also serves to favor the directed absorption of the API within the oral cavity rather than enteric uptake in the gastrointestinal (GI) tract.

In specific embodiments, the oral dissolvable film is palatable to a human.

In specific embodiments, the external surfaces of the oral dissolvable film have a smooth texture.

In specific embodiments, the oral dissolvable film has a high tensile strength.

In specific embodiments, the oral dissolvable film is pliable.

In specific embodiments, the oral dissolvable film is non-sticky to touch.

In specific embodiments, the oral dissolvable film does not readily stick to another oral dissolvable film.

In specific embodiments, the oral dissolvable film is relatively soft to touch.

In specific embodiments, the oral dissolvable film has a chewable configuration.

In specific embodiments, the oral dissolvable film has a resilient configuration.

In specific embodiments, the oral dissolvable film has an elastic or malleable configuration.

In specific embodiments, the oral dissolvable film has a ductile property.

In specific embodiments, the oral dissolvable film further includes a bitter blocker.

In specific embodiments, the oral dissolvable film further includes a powder coating present on at least one external surface of the oral dissolvable film.

In specific embodiments, the oral dissolvable film further includes a powder coating present on two opposing external surfaces of the oral dissolvable film.

In specific embodiments, the method of preparing an oral dissolvable film is carried out in the order indicated.

In specific embodiments, each of the steps of the method of preparing an oral dissolvable film is carried out in the order indicated.

In specific embodiments, the mixing includes blending.

In specific embodiments, each of the multiple oral dissolvable films of the system independently has a dimension of at least 15 mm×25 mm.

In specific embodiments, each of the multiple oral dissolvable films of the system independently has a dimension of up to 35 mm×50 mm.

In specific embodiments, each of the multiple oral dissolvable films of the system independently has a dimension of 23 mm×38 mm, ±5 mm.

In specific embodiments, each of the multiple oral dissolvable films of the system independently has a dimension of 23 mm×38 mm, ±3 mm.

In specific embodiments, each of the multiple oral dissolvable films of the system independently has a thickness of about 0.01 mm to about 20 mm.

In specific embodiments, each of the multiple oral dissolvable films of the system independently has a thickness of at least about 0.01 mm.

In specific embodiments, each of the multiple oral dissolvable films of the system independently has a thickness of up to about 20 mm.

In specific embodiments, each of the multiple oral dissolvable films of the system independently has a thickness of about 0.03 mm to about 1 mm.

The oral dissolvable film of any one of the above embodiments, further including a powder coating present on at least one external surface of the oral dissolvable film.

The oral dissolvable film of any one of the above embodiments, further including a powder coating present on two opposing external surfaces of the oral dissolvable film.

Stability in Oral Film Development

Common limitations of oral films are related to their instability in environments with high relative humidity, and the small drug dose that can be incorporated, essentially due to its small size, low weight and thin form. There are also some types of drugs that are difficult to incorporate in this pharmaceutical form, such as drugs that are unstable at buccal pH and that may irritate the oral mucosa.

Many excipients are designed to promote degradation. Some products however are inherently unstable and, as a result, may degrade too quickly before a drug can take effect.

Stabilizers, as used herein, are excipients that help the active pharmaceutical ingredient (API) maintain the desirable properties of the product until it is consumed by the patient.

The term "antioxidant" refers to an oxygen scavenger which prevents or reduce oxidative degradation of the API. Examples of oxygen scavengers or antioxidants that substantially improve long-term stability of an oral dosage form against oxidative degradation of the active agent are propyl gallate, EDTA, Copper II chloride, Vitamin E and Sodium metabisulfite. Other antioxidants are well-known in the art which include water soluble and oil soluble antioxidants such as sodium sulphite, sodium bisulphite, sodium thiosulphate, sodium formaldehyde sulfoxylate, sulphur dioxide, ascorbic acid, gallic acid, propyl gallate, isoascorbic acid, thioglycerol, thioglycolic acid, cysteine hydrochloride, acetylcysteine, butylated hydroxy toluene, butylated hydroxy anisole, alpha tocopherols, lecithin, ascorbyl palmitate, nordihydroguaiaretic acid.

The oral film must effectively maintain the requisite stability of ingredients (inactive and active) present therein, over the extended periods of time typically encountered with the packaging, shipping and storage. The oral film should also effectively maintain a relatively uniform distribution of such components over the extended periods of time typically encountered with the packaging, shipping and storage.

Stability is typically challenged during formulation development and different stabilizers are tested at different levels. The order of addition during preparation of the blend can impact the efficiency of the stability strategy. Ensuring that the stabilizer is soluble is also critical in solutions. During formulation, the different prototypes are placed under aggressive conditions such as 50° C. and tested at increasing intervals of time. In this disclosure, the testing mainly focused on degradation product and if possible identifying those products to understand the degradation path and identify best stabilizer.

Tryptamines and Psilocybin

Tryptamines and more specifically psilocybin and its derivatives are an important group of compounds with various medicinal possibilities. Tryptamine is an indolamine metabolite of the essential amino acid, tryptophan. The chemical structure is defined by an indole—a fused benzene and pyrrole ring, and a 2-aminoethyl group at the third carbon. The structure of tryptamine is a shared feature of certain aminergic neuromodulators including melatonin, serotonin, bufotenin and psychedelic derivatives such as dimethyltryptamine (DMT), psilocybin, psilocin and others.

Psilocybin Derivatives

| Derivative | Description |
|---|---|
| Psilocin | Dephosphorylated psilocybin. |
| Norpsilocin | Psilocin with one methyl in the ethyl amino group. |
| Aeruginascin | Psilocybin with three methyl groups in the ethyl amino group. |
| Baeocystin | Psilocybin with one methyl in the ethyl amino group. |
| Norbaeocystin | Psilocybin with no methyl groups on the ethyl amino group. |
| Bufotenin | Psilocin substituted on the $5^{th}$ carbon instead of the $4^{th}$. |
| Bufotenidine | Bufotenin with three methyl groups on the ethyl amino group. |

The effects caused by the administration of tryptamines are closely related to their structures, as each of these compounds has a different receptor affinity to which are related psychoactive phenomena. Tryptamines show agonist action at multiple receptors including 5HT2a-1a-2c, serotonin receptors, and several ion channels. (Ray T. S. Psychedelics and the Human Receptorome. 2010.)

The metabolism of the amino acid L-tryptophan is a highly regulated physiological process leading to the generation of several neuroactive compounds within the central nervous system. These include the aminergic neurotransmitter serotonin (5-hydroxytryptamine, 5-HT), products of the kynurenine pathway of tryptophan metabolism (including 3-hydroxykynurenine, 3-hydroxyanthranilic acid, quinolinic acid and kynurenic acid), the neurohormone melatonin, several neuroactive kynuramine metabolites of melatonin, and the trace amine tryptamine. The integral role of central serotonergic systems in the modulation of physiology and behaviour has been well documented since the first description of serotonergic neurons in the brain some 40 years ago.

Several classifications have been suggested for these substances. Tryptamines can be divided into two main groups: the simple tryptamines, including dimethyltryptamine (DMT), and the ergolines (a group of chemical compounds that were originally synthesized from a fungus ergot, among which is the lysergic acid diethylamide (LSD). Tryptamines have been further subdivided into three subgroups: (1) simple tryptamines, without modification of the indole ring; (2) tryptamines having a modification on the 4-position on the indole ring; (3) tryptamines having a modification on the 5-position. Only substitutions on the 4-5 positions were considered in such a subdivision because changes in position 6 or 7 resulted in reduced hallucinogenic activity. (Hill S. L, Thomas S. H. Clinical Toxicology of newer recreational drugs. Clin. Toxicol. 2011; 49(8):705-719. doi: 10.3109/15563650.2011.615318.)

When the drug is administered orally, only about 50% of the drug is absorbed into the bloodstream because of the first pass metabolism effect and the maximum plasma concentration occurring only after approximately 80 minutes. To improve such pharmacokinetic data, there is a need for the development of a stable psilocybin formulation where the absorption of the drug takes place in the mouth through the buccal mucosa, formulations and processes for doing so will be disclosed herein. Such a formulation will enable the drug to reach the systemic circulation directly limiting the hepatic metabolism. The result will include several therapeutic benefits such as faster onset of action, increased bioavailability, and lessened drug side effects such as nausea and panic attacks.

Psilocybin is a prodrug that turns to its pharmacologically active ingredient psilocin in the body. Both products are psychedelic compounds found naturally in hallucinogenic mushrooms belonging to the genera of Psilocybe. Psilocin and Psilocybin can be present in concentrations up to 0.5% and 2% w/w, respectively, in hallucinogenic mushrooms.

When ingested, psilocybin is rapidly broken down to psilocin in the digestive track by a chemical process called dephosphorylation that removes the phosphate group on psilocybin, creating psilocin. The dephosphorylation of psilocybin occurs in two ways in different areas of the body; 1) The acidic environment in the stomach is a favorable environment for the rapid dephosphorylation of psilocybin, or 2) Enzymes such as alkaline phosphatase and other non-specific esterases dephosphorylate psilocybin in the intestines, kidneys, and the blood.

Psilocybin and psilocin are both indole compounds, are known to be potent 5-HT agonists, and can cross the blood-brain barrier. The similarity in structure of psilocin to serotonin is illustrated here:

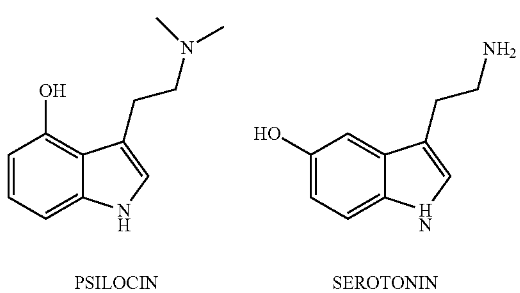

PSILOCIN SEROTONIN

Formulated and administered correctly, psilocin and psilocybin provide fast-acting and long-lasting changes to a person's mood and beyond in term of medicinal effects. These effects can be accomplished with only minor side effects, low potential for addiction, low potential for abuse, and low risk of toxicity. A useful summary of the role of psilocybin in humans can be found in Passie et al. (2002), "The Pharmacology of Psilocybin," Addiction Biology 7: 357-364. That psilocybin has neurogenerative properties was elucidated by Catlow et al. (2013), "Effects of psilocybin on hippocampal neurogenesis and extinction of trace fear conditioning," Experimental Brain Research 228: 481-491.

Recent studies on psilocybin, its derivatives and combinations thereof, have been reported to have efficacy in models and small clinical trials of post treatment Lyme disease syndrome, dementias, Alzheimer's disease, post-traumatic stress disorder, anorexia nervosa, depression and anxiety, abuse disorders including opioid addiction, alcohol addiction, nicotine addiction, cannabinoid addiction, headache, central nervous system inflammation, dementia, and disorders of cognition and memory. Psilocybin has also been reported to acutely reduce clinical symptoms of depressive disorders. (Journal of Psychopharmacology, Volume: 36 issue: 1, page(s): 114-125, Jan. 4, 2022)

Critical Parameters for Tryptamines and Stability

The critical parameter in this disclosure is the presence of an inorganic acid such as phosphoric acid which dissolves the psilocybin and allows it to permeate the mucosa, while also stabilizing the product. This effect is not only related to the pH since different acids are not shown to provide the same protection against degradation.

The best data obtained and the lower level of degradation product is observed without any common stabilizers such as antioxidants. All of the stabilizers tested generated more degradation products than the exemplary formulation without any stabilizers except for copper chloride which shows no effect. The solution is the presence of phosphoric acid in the formulation which is there to allow psilocybin to penetrate the oral mucosa. The stabilization effect appears not to be simply related to the pH as when the phosphoric acid is replaced by citric acid the product is more prone to degradation.

It is commonly expected that a stabilizer is required to prevent the degradation of a product. It is unexpected that an acid like phosphoric acid is stabilizing the product. It is also unexpected that common stabilizer like EDTA, BHT, vitamin E, copper and other are promoting the degradation. Not only do they not have a positive impact they have a negative one.

Example 1

In this example, it is disclosed a psilocybin film composition using phosphoric acid as the stabilizer, solubilizer and pH modifier.

| | | Quantity per unit (%) | | |
|---|---|---|---|---|
| Component/ Grade | Function | Good conc. | Preferred conc. | Justification |
| Glycerin USP | Plasticizer | 2-12 | 7-10 | Psilocybin film is a polymeric film that needs some plasticizer to have good mechanical properties. Glycerin is added to the formulation to improve the softness and reduce the brittleness of the film. |
| Sucralose USP | Sweetener | less than 1 | | Sucralose has a great sugar-like taste that can help masking psilocybin bitter taste in the film. |
| D-Maltitol NF | Pore former, disintegrating agent | 4-10 | 5-9 | D-maltitol is freely soluble in water. Hence, it is used as a pore former in the film helping the matrix of the film to hydrate and disintegrate upon contact with saliva. |
| Psilocybin | Drug substance | 4-10 | 5-9 | Psilocybin is the active pharmaceutical ingredient aimed to treat mental health disorders such anxiety and depression. |
| L-menthol USP | Flavoring agent | Less than 2 | 1-2 | The drug substance psilocybin has a bitter taste. L-menthol helps to mask the bitterness in the film and improve patient compliance |
| Copovidone (Plasdone S630) USP, EP, JPE | Film former polymer | 30-55 | 40-50 | Copovidone is the main film former polymer in psilocybin film. The amount used enables the film to have good mechanical proprieties as elasticity, good folding characteristics and malleability |

-continued

| Component/ Grade | Function | Quantity per unit (%) Good conc. | Preferred conc. | Justification |
|---|---|---|---|---|
| Hypromellose (HPMC E50) USP, Ph. Eur., JP | Film former polymer | 12-25 | 15-20 | Is used as a secondary film former polymer whose role is to increase blend viscosity since the two other film former polymers have low viscosity in solution |
| Hypromellose (HPMC E05) USP. EP, JP and ChP | Film former polymer | 2-6 | 3-5 | Hypromelose E5 is used as a tertiary film former polymer. Due to its low viscosity, it helps to have a fast hydration of the film in the mouth which improves film mucoadhesion and film retention time in the mouth. |
| Phosphoric acid ($H_3PO_4$) NF | Stabilizer, solubilizer and pH modifier | 1-8 | 3-7 | Phosphoric acid play critical roles in the film formulation 1-Acidifier: Psilocybin film is designed for buccal absoption in the mouth. Permeability studies with fresh pig mucosa showed that diffusion of the drug through porcine mucosa only happens with acidic films. The proportion of phosphoric acid used in the film formula is necessary to produce a film with a surface pH = 2 that is optimal for buccal absorption 2-Solubilizer: phosphoric acid solubilises and maintains the psilocybin in solution during blend preparation 3-Stabilizer: Stability studies that compared phosphoric acid with citric acid and with several antioxidants agents showed that psilocybin films made with only phosphoric acid produced the best impurity profile after storing the films at 50 C. for two weeks |
| Purified water USP | Solvent | | | Solvent used to dissolve the water-soluble ingredients. A remaining quantity of purified water is desired to ensure the flexibility of the film and avoid brittleness. |
| Methanol NF | Solvent | | | Since L-menthol is insoluble in water, small amount of methanol is used to dissolve L-menthol in order to disperse it into the blend during blend preparation. Methanol is then evaporated during the drying process. |

According to some embodiments, the exemplary psilocybin oral dosage forms disclosed herein can be prepared by dissolving or finely dispersing psilocybin and film forming polymers in a solvent, along with any other desired additives. Such additives include, but are not limited to, an acidifying agent, an antioxidant, a plasticizer, a penetration enhancer, a mucoadhesive agent, a flavoring agent, a coloring agent, a freshening agent, a sweetener, a filler, or a combination of additives. The films may then be cast on a suitable substrate by removing (e.g., evaporating) the solvent or solvents from the formulation to produce a dry film. Typically, the psilocybin film can be cast to produce a film having a thickness of from 100 micrometers to 1500 micrometers or 500 micrometers to 1000 micrometers. The dry film can be cut in appropriate sizes, typically an area of from about 1 square centimeter to about 15 square centimeters, to provide an appropriate dose for transmucosal delivery of psilocybin, to treat depression, anxiety, or addictive disorders.

According to some other embodiments, the tryptamine oral film comprises tryptamine active or derivatives suspended in amorphous form within the oral film matrix.

According to some other embodiments, more than one tryptamine is present in the oral dissolvable film.

Example 2

In this example, the stability data from Example 1 was studied.

Figure 2:
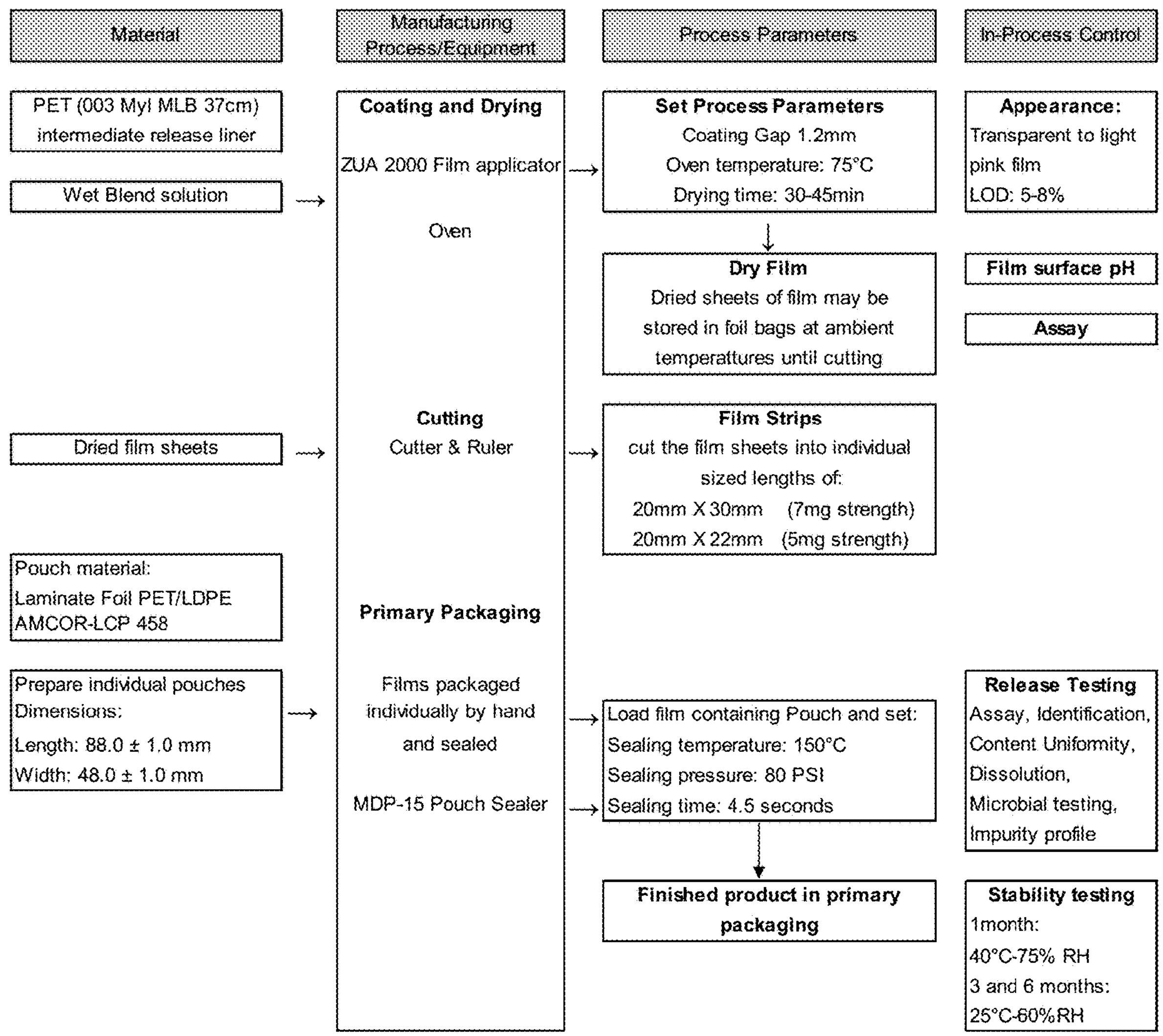
Referring to FIG. 2, the flow chart demonstrates the process of coating, drying and packaging for psilocybin sublingual films.

Psilocybin films of the present disclosure were packaged in sealed, air and moisture resistant packages as described in the process flow chart of FIG. 2, put in stability chamber and analyzed for assay and impurities as per the following stability protocol.

| | Psilocybin 7 mg film: Stability Conditions | | | |
|---|---|---|---|---|
| Pull time | 25° C./ 60% RH | 30° C./ 75% RH | 40° C./ 75% RH | 50° C |
| T = 0 | X | X | X | X |
| 2 week | | | | X |
| 1 month | | | X | |
| 3 months | X | X | X | |
| 6 months | X | X | X | |

The stability of the film is strong except for the formation of psilocin under accelerated conditions however, the product appears to be stable including for the psilocin under intermediate conditions. In addition, since psilocybin is the pro drug of psilocin a higher level of the product can be accepted in the finished product.

| Test | Assay | Psilocin | Individual Unknown impurity | Total impurity |
|---|---|---|---|---|
| Specification | 90.0 to 110.0 % LC | NMT 1.0% | NMT 0.2% | NMT 1.5% |
| T = 0 | 98.9% | 0.22% | 0.1% (RRT 0.61)<br>0.05% (RRT 2.18)<br>0.08% (RRT 2.76) | 0.23% |

-continued

| Test | Assay | Psilocin | Individual Unknown impurity | Total impurity |
|---|---|---|---|---|
| 18 Days 50° C. | 97.9 | 0.89 | 0.13% (RRT 0.60)<br>0.06% (RRT 0.63)<br>0.09% (RRT 2.85) | 0.28% |
| 1 month 40° C./75% RH | 98.1 | 0.57 | 0.13% (RRT 0.60)<br>0.07% (RRT 0.63)<br>0.09% (RRT 2.86) | 0.29% |
| 3 Month 25° C./60% RH | 96.5 | 0.33 | 0.11% (RRT 0.59)<br>0.07% (RRT 0.61)<br>0.08% (RRT 2.71) | 0.26% |
| 3 Month 30° C./75% RH | 96.6 | 0.44 | 0.11% (RRT 0.59)<br>0.08% (RRT 0.61)<br>0.08% (RRT 2.71 | 0.27% |
| 3 Month 40° C./75% RH | 95.7 | 1.16 | 0.12% (RRT 0.59)<br>0.10% (RRT 0.61)<br>0.08% (RRT 2.50)<br>0.08% (RRT 2.71) | 0.37% |
| 6 Month 25° C./60% RH | 96.3 | 0.34 | 0.11% (RRT 0.59)<br>0.06% (RRT 0.61)<br>0.08% (RRT 2.72) | 0.25% |
| 6 Month 30° C./75% RH | 95.9 | 0.53 | 0.14% (RRT 0.59)<br>0.08% (RRT 0.61)<br>0.06% (RRT 2.59)<br>0.08% (RRT 2.72) | 0.36% |
| 6 Month 40° C./75% RH | 95.4 | 2.40 | 0.12% (RRT 0.59)<br>0.11% (RRT 0.61)<br>0.07% (RRT 2.50)<br>0.07% (RRT 2.72) | 0.37% |

Example 3

In this example, it is disclosed a psilocybin film formulation using phosphoric acid and benzalkonium chloride as the penetration enhancer.

L#157-65 (High dose psilocybin film in phosphoric acid S. 0.1M, pH = 1.7) with less Benzalkonium chloride and less Menthol

| Steps # | Ingredients | Amount (s) | % wet (w/w) | % dry (w/w) |
|---|---|---|---|---|
| 2 | water | 14.853 | 77.69 | — |
| 2 | ~~Sodium phosphate Monobasic ($NaH_2PO_4$)~~ | 0.000 | ~~0.00~~ | ~~0.00~~ |
| 2 | Phosphoric acid ($H_3PO_4$) | 0.147 | 0.77 | 3.45 |
| 3 | Psilocybin | 0.300 | 1.57 | 7.03 |
| 4 | benzalkonium chloride | 0.100 | 0.52 | 2.34 |
| 5 | Plasdone S630 | 1.998 | 10.45 | 46.35 |
| 7 | L-menthol (in 0.5 ml of methanol) | 0.100 | 0.52 | 2.34 |
| 6 | D-Maltitol | 0.300 | 1.57 | 7.03 |
| 6 | HPMC E50 | 0.720 | 3.77 | 16.83 |
| 6 | HPMC E5 | 0.180 | 0.94 | 4.22 |
| 1 | Glycerol | 0.400 | 2.09 | 9.38 |
| 5 | Sodium sulfite | 0.020 | 0.10 | 0.47 |
| | Total Wet | 19.118 | 100.000 | |
| | Dry | 4.265 | | 100.000 |
| | % solids | 22.309 | | |

Film surface pH = 2.06

Blend pH = 1.9

Example 4

In this example, it is disclosed a psilocybin film formulation made with phosphoric acid and benzalkonium chloride as penetration enhancer, with a buffer system and a higher pH.

| #157-49 (Psilocybin film in PBS 0.3 M, H3) with menthol & Benzalkonium chloride | | | | |
|---|---|---|---|---|
| Steps # | Ingredients | Amount (g) | % wet (w/w) | % dry (w/w) |
| 2 | water | 14.468 | 75.87 | — |
| 2 | Sodium phosphate monobasic ($NaH_2PO_4$) | 0.500 | 2.62 | 10.87 |
| 2 | Phosphoric acid ($H_3PO_4$) | 0.032 | 0.17 | 0.70 |
| 4 | Psilocybin | 0.150 | 0.79 | 3.26 |
| 3 | benzalkonium chloride | 0.150 | 0.79 | 3.26 |
| 5 | Plasdone S630 | 1.998 | 10.48 | 43.43 |
| 6 | i-menthol (in 1 ml methanol) | 0.350 | 1.84 | 7.61 |
| | ~~Sodium CMC(Aqualon CMC 9M8F Ph)~~ | 0.000 | 0.00 | 0.00 |
| 7 | HPMC E50 | 0.720 | 3.78 | 15.65 |
| 7 | HPMC E5 | 0.180 | 0.94 | 3.91 |
| 1 | Glycerol | 0.500 | 2.62 | 10.87 |
| 5 | Sodium sulfite | 0.020 | 0.10 | 0.43 |
| | Total Wet | 19.068 | 100.000 | |
| | Dry | 4.600 | | 100.000 |
| | % solids | 24.126 | | |

Film surface pH = 3.7

Example 5

In Example 5, it is disclosed a study of psilocybin film formulations using different surface pH and penetration enhancers.

| #157-52 (Psilocybin film in phosphoric acid S. 0.1M, pH = 1.7) with menthol & Benzalkonium chloride | | | | |
|---|---|---|---|---|
| Steps # | ingredients | Amount (g) | % wet (w/w) | % dry (w/w) |
| 2 | water | 14.853 | 77.89 | — |
| 2 | ~~Sodium phosphate Monobasic ($NaH_2PO_4$)~~ | 0.000 | 0.00 | 0.00 |
| 2 | Phosphoric acid ($H_3PO_4$) | 0.147 | 0.77 | 3.49 |
| 4 | Psilocybin | 0.150 | 0.79 | 3.56 |
| 3 | benzalkonium chloride | 0.150 | 0.79 | 3.56 |
| 5 | Plasdone S630 | 1.398 | 10.48 | 47.40 |
| 6 | L-menthol (in 1 ml methanol) | 0.350 | 1.84 | 8.30 |
| | ~~Sodium CMC (Aqualon CMC 9M8F PH)~~ | 0.000 | 0.00 | 0.00 |
| 7 | HPMC E50 | 0.720 | 3.78 | 17.08 |
| 7 | HPMCE5 | 0.180 | 0.94 | 4.27 |
| 1 | Glycerol | 0.500 | 2.62 | 11.86 |
| 5 | Sodium sulfite | 0.020 | 0.10 | 0.47 |
| | Total Wet | 19.068 | 100.000 | |
| | Dry | 4.215 | | 100.000 |
| | % solids | 22.105 | | |

Film surface pH = 2

| #157-51 (Psilocybin film in PBS 0.1M, pH = 2) with menthol & cetylpyridinium chloride | | | | |
|---|---|---|---|---|
| Steps # | ingredients | Amount (s) | % wet (w/w) | % dry (w/w) |
| 2 | water | 14.840 | 78.23 | — |
| 2 | Sodium phosphate monobasic ($NaH_2PO_4$) | 0.074 | 0.39 | 1.78 |
| 2 | Phosphoric acid ($H_2PO_4$) | 0.087 | 0.46 | 2.10 |
| 4 | Psilocybin | 0.150 | 0.79 | 3.63 |
| 3 | cetypyridinium chloride | 0.150 | 0.79 | 3.63 |

-continued

| #157-51 (Psilocybin film in PBS 0.1M, pH = 2) with menthol & cetylpyridinium chloride | | | | |
|---|---|---|---|---|
| Steps # | ingredients | Amount (s) | % wet (w/w) | % dry (w/w) |
| 5 | Plasdone S630 | 1.998 | 10.53 | 48.40 |
| 6 | L-menthol (in 1 ml methanol] | 0.350 | 1.85 | 8.48 |
| | ~~Sodium CMC (Aqualon CMC 9M8F PH)~~ | 0.000 | 0.00 | 0.00 |
| 7 | HPMC E50 | 0.720 | 3.80 | 17.44 |
| 7 | HPMC E5 | 0.180 | 0.95 | 4.36 |

-continued

| #157-51 (Psilocybin film in PBS 0.1M, pH = 2) with menthol & cetylpyridinium chloride | | | | |
|---|---|---|---|---|
| Steps # | ingredients | Amount (s) | % wet (w/w) | % dry (w/w) |
| 1 | Glycerol PEG 300 | 0.400 | 2.11 | 9.69 |
| 5 | Sodium sulfite | 0.020 | 0.11 | 0.48 |
| | Total Wet | 18.968 | 100.000 | |
| | Dry | 4.128 | | 100.000 |
| | % solids | 21.765 | | |

Film surface pH = 2.8

Example 6

The disclosed film can be used in a monolayer form, or in a multilayer form. In particular, a barrier layer can be advantageously employed to prevent the active agent from diffusing through a bioadhesive film into the oral cavity of a subject after it is adhered to the subject's oral mucosa. The barrier layer is preferably comprised of polymers having a low solubility in water. A combination of water-insoluble polymer(s) and a minor amount of a water-soluble polymer (s) can be employed to maintain a barrier that prevents loss of the active agent to the oral cavity until an effective or desired amount of the active agent has been transmucosally delivered, and which allows erosion and/or dissolution thereafter. In some cases it may be advantageous to employ, in the barrier layer, higher molecular weight polymer analogs of the polymer(s) used in the bioadhesive layer. The higher molecular weight (or, equivalently, higher viscosity) analogs are typically more resistant to diffusion and dissolution, and exhibit better compatibility than if polymers of a different chemical type are used.

Examples of water-insoluble polymers that can be employed in the barrier layer include polysiloxanes (silicone polymers), ethyl cellulose, propyl cellulose, polyethylene, and polypropylene. One or more of these polymers may comprise a majority of the barrier film layer by weight (i.e., at least 50 percent). Water soluble hydroxypropyl cellulose can be used in a minor amount to facilitate erosion and/or dissolution of the barrier layer after it has served its function during transmucosal delivery of the active agent. High viscosity polymer could also be used to create a barrier and limit erosion. For example, hydroxypropyl cellulose, polyethylene oxide, polyvinyl pyrrolidone and any other polymer soluble in water, but exhibiting high viscosity, can be used.

Uptake of API in the oral cavity using film based pharmaceuticals can be surprisingly improved using a multilayer film strategy. In its simplest embodiment, a multilayer film consists of at least two layers. The first layer which contains the API and mucoadhesive polymers to ensure adhesion and close contact with the oral mucosa. The second layer, or backing layer, serves to slow the solubilization of the film by limiting the wetting of the active layer, while at the same time reducing abrasion from the tongue and cheek. In this way, we direct and favor absorption of the API from the active layer into the oral mucosa and underlying capillaries, rather than having the active layer quickly disintegrated and swallowed. This multilayer strategy is not limited to a bilayer system, and could potentially incorporate other multilayers that may serve to further protect the active layer in modular time scales or for other purposes. Furthermore, the protective layer could be composed of variable % w/w of high molecular polymers to control the rate of disintegration and residence time in the oral cavity. Examples of high MW polymers that would be effective include but are not limited to HPC, HPMC, HEC, PVP, PVA or PEO.

The protective backing layer can be used to further increase the local concentration at the membrane interface and minimize ionization of the active agent due to the local pH environment within the oral cavity.

The pH within the mouth typically ranges from pH 6-7.5. Therefore, as a monolayer film is placed in the mouth and begins to solubilize, tryptamines that are not absorbed directly into the oral mucosa will be exposed to the lower pH environment, precipitate and be swallowed. Maintaining amorphous solubilized tryptamines is critical for ensuring the target pharmacokinetics. Therefore, in one embodiment the multilayer system further improves the tryptamine active oral film performance by maintaining the local pH environment around the active film layer, which improves tryptamines such as psilocybin absorption in the oral cavity.

According to another embodiment, the multilayer tryptamine film comprises acidic buffering agents or general acidifying excipients such as phosphoric acid.

In another embodiment of the multilayer tryptamine oral platform, the oral film comprises an active layer directly placed against the mucosa, a middle layer serving to protect the active layer from oral environment, and a third layer containing acidifying agents or acid buffering components to maintain the pH below 5. This strategy of maintaining the pH environment can also be extended to basic pH environments which could improve both solubility and stability for tryptamines that could have different pKa profiles than psilocybin and its derivatives.

In Example 6, an exemplary tryptamine bilayer film is disclosed. The bilayer film has the penetration enhancer in the backing layer to prevent color change in the film.

| Active layer Lot 157-02 | | | | |
|---|---|---|---|---|
| Steps # | Ingredients | Amount (s) | % wet (w/w) | % dry (w/w) |
| 2 | water | 14.84 | 79.30 | — |
| 2 | $NaH_2PO_4$ | 0.07 | 0.39 | 1.90 |
| 2 | $H_3PO_4$ | 0.09 | 0.46 | 2.24 |
| 3 | Psilocybin | 0.15 | 0.80 | 3.87 |
| 5 | Plasdone S630 | 2.00 | 10.68 | 51.58 |
| S | Aqualor CMC 9M8F PH | 0.15 | 0.80 | 3.87 |
| 6 | HPMC E50 | 0.72 | 3.85 | 18.59 |
| 6 | HPMC E05 | 0.18 | 0.96 | 4.65 |
| 1 | Glycerol | 0.50 | 2.67 | 12.91 |
| 4 | Sodium sulfite | 0.02 | 0.08 | 0.39 |
| | Total Wet | 18.71 | 100.00 | |
| | Dry | 3.87 | | 100.00 |
| | % solids | 20.70 | | |

| Placebo backing layer Lot 157-38 (Placebo + benzalkonium chloride in PBS pH = 2) | | | | |
|---|---|---|---|---|
| Steps # | Ingredients | Amount (g) | % wet (w/w) | % dry (w/w) |
| 2 | water | 14.840 | 76.13 | — |
| 2 | $NaH_2PO_4$ | 0.074 | 0.38 | 1.58 |
| 2 | $H_3PO_4$ | 0.087 | 0.45 | 1.87 |
| 3 | Benzalkonium chloride | 0.200 | 1.03 | 4.30 |
| 4 | Sucralose | 0.011 | 0.05 | 0.23 |
| 1 | Peg 300 | 0.318 | 1.63 | 6.83 |

-continued

| Placebo backing layer Lot 157-38 (Placebo + benzalkonium chloride in PBS pH = 2) | | | | | |
|---|---|---|---|---|---|
| Steps # | Ingredients | Amount (g) | % wet (w/w) | % dry (w/w) |
| 5 | PEO 200 000 (WSR-N80) | 0.170 | 0.87 | 3.65 |
| 5 | Plasdone S630 | 1.038 | 5.33 | 22.31 |
| 5 | Nisso HPC L | 2.756 | 14.14 | 59.23 |
| | Total Wet | 19.49 | 100.00 | |
| | Dry | 4.65 | | 100.00 |
| | % solids | 23.87 | | |

Example 7

In this example, it is disclosed a psilocybin film formulation using Copper (III) Chloride as the antioxidant. The formulation exhibits good stability data when the drug is suspended, however, no permeability through the pig's mucosa is observed.

| L#157-91-A (Copper (II) chloride) | | | |
|---|---|---|---|
| Ingredients | Amount (g) | % wet (w/w) | % dry (w/w) |
| water | 14.783 | 78.16 | — |
| Phosphoric acid ($H_3PO_4$) | 0.217 | 1.15 | 5.25 |
| Psilocybin (GMP sample) | 0.245 | 1.30 | 5.93 |
| Anti-oxidant: Copper (II) chloride | 0.00020 | 0.0011 | 0.005 |
| Glycerol | 0.400 | 2.11 | 9.68 |
| L-menthol (in 0.5 ml of methanol) | 0.050 | 0.26 | 1.21 |
| Plasdone S630 | 1.998 | 10.56 | 48.38 |
| D-Maltitol | 0.300 | 1.59 | 7.26 |
| sucralose | 0.020 | 0.11 | 0.48 |
| HPMC E50 | 0.720 | 3.81 | 17.43 |
| HPMC E05 | 0.180 | 0.95 | 4.36 |
| Total Wet | 18.913 | 100.000 | |
| Dry | 4.130 | | 100.000 |
| % solids | 21.838 | | |

blend pH = 1.87
film pH = 2

Example 8

In the study below, stability of a suspended psilocybin API is measured in the presence and absence of acid. Better stability is observed for the suspended API, 153-51, 52 and 53 when no acid is present however, the stability in presence of phosphoric acid is improved when the pH is adjusted to acidic 157-09 A versus B).

| L#153-51 | | | | |
|---|---|---|---|---|
| | Ingredients | Amount (g) | % wet | % dry (w/w) |
| 1 | Water | 15.000 | 79.34 | |
| 5 | Evospray Lime Flavor | 0.115 | 0.61 | 2.9 |
| 2 | PEG 300 | 0.195 | 1.03 | 5.0 |
| 3 | Sucralose | 0.035 | 0.19 | 0.9 |
| 4 | Sodium sulfite | 0.016 | 0.08 | 0.4 |
| 6 | Pscilocybin | 0.357 | 1.89 | 9.1 |
| 7 | L menthol | 0.050 | 0.26 | 1.3 |
| 8 | Methanol | 0.025 | 0.13 | 0.6 |
| 9 | Polyethylene Oxide 200 000 (WSR-N80) | 1.950 | 10.31 | 49.9 |

-continued

| L#153-51 | | | | |
|---|---|---|---|---|
| | Ingredients | Amount (g) | % wet | % dry (w/w) |
| 10 | HPMC E5 | 0.900 | 4.76 | 23.0 |
| 11 | HPMC E50 | 0.263 | 1.39 | 6.7 |
| | Wet | 18.91 | 100.0 | |
| | Dry | 3.91 | | 100.0 |
| | % solids | 20.66 | | |

| L#153-52 (HPMC-HPC-sorbitol + Maltodextrin) | | | | |
|---|---|---|---|---|
| | Ingredients | Amount (g) | % wet (w/w) | % dry (w/w) |
| A (50%) | Methanol | 7.150 | 37.34 | — |
| B (50%) | Purified water | 7.150 | 37.34 | — |
| 1 | Propylene Glycol | 0.475 | 2.48 | 9.78 |
| 2 | L-Menthol | 0.065 | 0.34 | 1.34 |
| 3 | Sucralose | 0.036 | 0.19 | 0.75 |
| 4 | Sodium sulfite | 0.018 | 0.09 | 0.37 |
| 5 | Psilocybin | 0.351 | 1.83 | 7.24 |
| 6 | Sorbitol | 0.325 | 1.70 | 6.70 |
| 7 | Maltodextrin | 0.325 | 1.70 | 6.70 |
| | hydroxylated lecitin soy | 0.265 | 1.38 | 5.46 |
| 8 | HPMC (Benecel E5) | 0.780 | 4.07 | 16.08 |
| 9 | Nisso HPC-L Fine powder | 2.210 | 11.54 | 45.57 |
| | Wet | 19.150 | 100.0 | |
| | Dry | 4.85 | | 100.0 |
| | % solids | 25.33 | | |

| L#153-55 (Psilocybin formulation in methanol 100%) | | | | |
|---|---|---|---|---|
| | Ingredients | Amount (g) | % wet (w/w) | % dry (w/w) |
| A (100%) | Methanol | 12.000 | 72.18 | — |
| 1 | Propylene Glycol | 0.384 | 2.31 | 8.30 |
| 2 | L-Menthol | 0.062 | 0.37 | 1.34 |
| 3 | Sucralose | 0.029 | 0.17 | 0.63 |
| 4 | Sodium metabisulfite | 0.020 | 0.12 | 0.43 |
| 5 | Psilocybin | 0.340 | 2.05 | 7.35 |
| 6 | Sorbitol | 0.200 | 1.20 | 4.32 |
| 7 | Plasdone S-630 | 0.650 | 3.91 | 14.05 |
| | Tween 20 (super refined | 0.240 | 1.44 | 5.19 |
| 8 | HPMC-AS | 1.200 | 7.22 | 25.95 |
| 9 | Nisso HPC-SL Fine powder | 1.500 | 9.02 | 32.43 |
| | Wet | 16.625 | 100.0 | |
| | Dry | 4.63 | | 100.0 |
| | % solids | 27.82 | | |

| Lot 157-09-A PBS 0.1M-pH = 2 | | | | |
|---|---|---|---|---|
| Steps # | Ingredients | Amount (g) | % wet (w/w) | % dry (w/w) |
| 2 | water | 14.84 | 78.60 | — |
| 2 | $NaH_2PO_4$ | 0.07 | 0.39 | 1.82 |
| 2 | $H_3PO_4$ | 0.09 | 0.46 | 2.15 |
| 3 | Psilocybin | 0.15 | 0.79 | 3.71 |

-continued

| Lot 157-09-A PBS 0.1M-pH = 2 | | | | |
|---|---|---|---|---|
| Steps # | Ingredients | Amount (g) | % wet (w/w) | % dry (w/w) |
| | benzalkonium chloride | 0.15 | 0.79 | 3.71 |
| 5 | Plasdone S630 | 2.00 | 10.58 | 49.44 |
| 6 | Aqualon CMC 9M8F PH | 0.15 | 0.79 | 3.71 |
| 6 | HPMC E50 | 0.72 | 3.81 | 17.82 |
| 6 | HPMC E5 | 0.18 | 0.95 | 4.45 |
| 1 | Glycerol | 0.50 | 2.65 | 12.37 |
| 4 | Ascorbic acid | 0.03 | 0.17 | 0.82 |
| | Total Wet | 18.88 | 100.00 | |
| | Dry | 4.04 | | 100.00 |
| | % solids | 21.40 | | |

| Lot 157-09-B PBS 0.1M-pH = 7 | | | | |
|---|---|---|---|---|
| Steps # | Ingredients | Amount (g) | % wet (w/w) | % dry (w/w) |
| 2 | water | 14.801 | 78.44 | — |
| 2 | $Na_2HPO_4$ | 0.173 | 0.65 | 3.02 |
| 2 | $NaH_3PO_4$ | 0.076 | 0.40 | 1.87 |
| 3 | Psilocybin | 0.150 | 0.79 | 3.69 |
| | benzalkonium chloride | 0.150 | 0.79 | 3.69 |
| 5 | Plasdone S630 | 1.998 | 10.59 | 49.13 |
| 6 | Aqualon CMC 9M8F PH | 0.150 | 0.79 | 3.69 |
| 6 | HPMC E50 | 0.720 | 3.62 | 17.70 |
| 6 | HPMC E5 | 0.180 | 0.95 | 4.43 |
| 1 | Glycerol | 0.500 | 2.65 | 12.29 |
| 4 | Sodium sulfite | 0.020 | 0.11 | 0.49 |
| | Total Wet | 18.87 | 100.00 | |
| | Dry | 4.07 | | 100.00 |
| | % solids | 21.56 | | |

| Lot 157-10-A PBS 0.1M-pH = 2 | | | | |
|---|---|---|---|---|
| Steps # | Ingredients | Amount (g) | % wet (w/w) | % dry (w/w) |
| 2 | water | 14.84 | 78.67 | — |
| 2 | $NaH_2PO_4$ | 0.07 | 0.39 | 1.83 |
| 2 | $H_3PO_4$ | 0.09 | 0.46 | 2.16 |
| 3 | Psilocybin | 0.15 | 0.80 | 3.73 |
| | Cetylpyridinium | 0.15 | 0.80 | 3.73 |
| 5 | Plasdone S630 | 2.00 | 10.59 | 49.66 |
| 6 | Aqualon CMC 9M8F PH | 0.15 | 0.80 | 3.73 |
| 6 | HPMC E50 | 0.72 | 3.82 | 17.89 |
| 6 | HPMC E5 | 0.18 | 0.95 | 4.47 |
| 1 | Glycerol | 0.50 | 2.65 | 12.43 |
| 4 | Ascorbic acid | 0.02 | 0.08 | 0.37 |
| | Total Wet | 18.86 | 100.00 | |
| | Dry | 4.02 | | 100.00 |
| | % solids | 21.33 | | |

| Lot 157-10-B PBS 0.1M-pH = 7 | | | | |
|---|---|---|---|---|
| Steps # | Ingredients | Amount (g) | % wet (w/w) | % dry (w/w) |
| 2 | water | 14.801 | 78.44 | — |
| 2 | $Na_2HPO_4$ | 0.173 | 0.65 | 3.02 |
| 2 | $NaH_3PO_4$ | 0.076 | 0.40 | 1.87 |
| 3 | Psilocybin | 0.150 | 0.79 | 3.69 |
| | Cetylpyridinium | 0.150 | 0.79 | 3.69 |
| 5 | Plasdone S630 | 1.998 | 10.59 | 49.13 |

-continued

| Lot 157-10-B PBS 0.1M-pH = 7 | | | | |
|---|---|---|---|---|
| Steps # | Ingredients | Amount (g) | % wet (w/w) | % dry (w/w) |
| 6 | Aqualon CMC 9M8F PH | 0.150 | 0.79 | 3.69 |
| 6 | HPMC E50 | 0.710 | 3.82 | 17.70 |
| 6 | HPMC E5 | 0.130 | 0.95 | 4.43 |
| 1 | Glycerol | 0.500 | 2.65 | 12.29 |
| 4 | Sodium sulfite | 0.020 | 0.11 | 0.49 |
| | Total Wet | 18.87 | 100.00 | |
| | Dry | 4.07 | | 100.00 |
| | % solids | 21.66 | | |

Example 9

In this example, an exemplary tryptamine oral dissolvable film is presented with Norpsilocin.

| | Ingredients | Amount (g) | % wet (w/w) | % dry (w/w) |
|---|---|---|---|---|
| 1 | Water | 15.000 | 78.58 | — |
| 5 | Evospray Lime Flavor | 0.115 | 0.60 | 2.8 |
| 2 | PEG 300 | 0.195 | 1.02 | 4.8 |
| 3 | Sucralose | 0.035 | 0.18 | 0.9 |
| 4 | Phosphoric acid | 0.200 | 1.05 | 4.9 |
| 6 | Norpsilocin | 0.357 | 1.87 | 8.7 |
| 7 | L-menthol | 0.050 | 0.26 | 1.2 |
| 8 | Methanol | 0.025 | 0.13 | 0.6 |
| 9 | Polyethylene Oxide 200 000 (WSR-N80) | 1.950 | 10.22 | 47.7 |
| 10 | HPMC E5 | 0.900 | 4.71 | 22.0 |
| 11 | HPMC E50 | 0.263 | 1.38 | 6.4 |
| | Wet | 19.09 | 100.0 | |
| | Dry | 4.09 | | 100.0 |
| | % solids | 21.42 | | |

Example 10

In this example, an exemplary tryptamine oral dissolvable film is presented with Norbaeocystin.

| | Ingredients | Amount (g) | % wet (w/w) | % dry (w/w) |
|---|---|---|---|---|
| 1 | Water | 15.000 | 82.87 | — |
| 5 | Lime Flavor | 0.115 | 0.64 | 3.7 |
| 2 | Propylene glycol | 0.255 | 1.41 | 8.2 |
| 3 | Sucralose | 0.035 | 0.19 | 1.1 |
| 4 | Phosphoric acid | 0.200 | 1.10 | 6.5 |
| 6 | Norbaeocystin | 0.250 | 1.38 | 8.1 |
| 7 | L-menthol | 0.050 | 0.28 | 1.6 |
| 8 | Methanol | 0.025 | 0.14 | 0.8 |
| 9 | Polyethylene Oxide 200 000 (WSR-N80) | 1.950 | 10.77 | 62.9 |
| 10 | Polyethylene Oxide 300 000 (WSR-N750) | 0.220 | 1.22 | 7.1 |
| | Wet | 18.10 | 100.0 | |
| | Dry | 3.10 | | 100.0 |
| | % solids | 17.13 | | |

Example 11

In this example, an exemplary tryptamine oral dissolvable film is presented with Aeruginascin.

| | Ingredients | Amount (g) | % wet (w/w) | % dry (w/w) |
|---|---|---|---|---|
| 1 | Water | 15.000 | 78.58 | — |
| 5 | Orange flavor | 0.122 | 0.64 | 3.0 |
| 2 | Propylene glycol | 0.300 | 1.57 | 7.3 |
| 3 | Sucralose | 0.035 | 0.18 | 0.9 |
| 4 | Phosphoric acid | 0.188 | 0.98 | 4.6 |
| 6 | Aeruginascin | 0.357 | 1.87 | 8.7 |
| 7 | L-menthol | 0.050 | 0.26 | 1.2 |
| 8 | Methanol | 0.025 | 0.13 | 0.6 |
| 9 | HPC Klucel LF | 1.550 | 8.12 | 37.9 |
| 10 | HPMC E5 | 0.900 | 4.71 | 22.0 |
| 11 | HPMC E50 | 0.562 | 2.94 | 13.7 |
| | Wet | 19.09 | 100.0 | 100.0 |
| | Dry | 4.09 | | |
| | % solids | 21.42 | | |

Example 12

In this example, an exemplary tryptamine oral dissolvable film is presented with Baeocystin.

| | Ingredients | Amount (g) | % wet (w/w) | % dry (w/w) |
|---|---|---|---|---|
| 1 | Water | 15.000 | 78.58 | — |
| 5 | Peppermint flavor | 0.115 | 0.60 | 2.8 |
| 2 | PEG 300 | 0.195 | 1.02 | 4.8 |
| 3 | Sucralose | 0.035 | 0.18 | 0.9 |
| 4 | Phosphoric acid | 0.230 | 1.20 | 5.6 |
| 6 | Baeocystin | 0.357 | 1.87 | 8.7 |
| 7 | L-menthol | 0.050 | 0.26 | 1.2 |
| 8 | Methanol | 0.025 | 0.13 | 0.6 |
| 9 | HPC Klucel LF | 1.880 | 9.85 | 46.0 |
| 10 | HPMC E5 | 0.900 | 4.71 | 22.0 |
| 11 | copovidone S630 | 0.302 | 1.58 | 7.4 |
| | Wet | 19.09 | 100.0 | 100.0 |
| | Dry | 4.09 | | |
| | % solids | 21.42 | | |

Example 13

In this example, an exemplary tryptamine oral dissolvable film is presented with Bufotenin.

| | Ingredients | Amount (g) | % wet (w/w) | % dry (w/w) |
|---|---|---|---|---|
| 1 | Water | 15.000 | 82.87 | — |
| 5 | Orange flavor | 0.115 | 0.64 | 3.7 |
| 2 | Glycerine | 0.195 | 1.08 | 6.3 |
| 3 | Sucralose | 0.035 | 0.19 | 1.1 |
| 4 | Phosphoric acid | 0.200 | 1.10 | 6.5 |
| 6 | Bufotenin | 0.230 | 1.27 | 7.4 |
| 7 | L-menthol | 0.050 | 0.28 | 1.6 |
| 8 | Methanol | 0.025 | 0.14 | 0.8 |
| 9 | HPC Klucel LF | 1.787 | 9.87 | 57.6 |
| 10 | HPMC E5 | 0.200 | 1.10 | 6.5 |
| 11 | copovidone S630 | 0.263 | 1.45 | 8.5 |
| | Wet | 18.10 | 100.0 | 100.0 |
| | Dry | 3.10 | | |
| | % solids | 17.12 | | |

Example 14

In this example, an exemplary tryptamine oral dissolvable film is presented with Bufotenidine.

| | Ingredients | Amount (g) | % wet (w/w) | % dry (w/w) |
|---|---|---|---|---|
| 1 | Water | 15.000 | 82.87 | — |
| 5 | Peppermint flavor | 0.115 | 0.64 | 3.7 |
| 2 | Glycerine | 0.195 | 1.08 | 6.3 |
| 3 | Sucralose | 0.035 | 0.19 | 1.1 |
| 4 | Phosphoric acid | 0.150 | 0.83 | 4.8 |
| 6 | Bufotenidine | 0.210 | 1.16 | 6.8 |
| 7 | L-menthol | 0.050 | 0.28 | 1.6 |
| 8 | Methanol | 0.025 | 0.14 | 0.8 |
| 9 | HPC Klucel LF | 1.220 | 6.74 | 39.4 |
| 10 | HPMC E50 | 0.750 | 4.14 | 24.2 |
| 11 | copovidone S630 | 0.350 | 1.93 | 11.3 |
| | Wet | 18.10 | 100.0 | |
| | Dry | 3.10 | | 100.0 |
| | % solids | 17.13 | | |

The oral films of the present disclosure are desirably packaged in sealed, air and moisture resistant packages to protect the active from exposure oxidation, hydrolysis, volatilization and interaction with the environment. Moreover, the films of the present invention dissolve quickly upon contact with saliva or mucosal membrane areas, eliminating the need to wash the dose down with water.

Desirably, a series of such unit doses are packaged together in accordance with the prescribed regimen or treatment, e.g., a 3-90 day supply, depending on the particular therapy. The individual films can be packaged on a backing and peeled off for use.

Manufacturing Process

As illustrated in FIG. 1 and FIG. 2, the currently disclosed oral film is produced by dissolving all the soluble ingredients in the media of choice and mixing until all excipients are solubilized yielding a uniform blend. The active ingredient is then added to the blend and solubilized or dispersed, depending on the formulation. The blend is mixed until uniform and then polymers are added to the blend and mixed until completely dissolved. Once dissolved and homogenous, the mixing speed is lowered to allow degassing of the blend.

Preparation of an oral film product typically involves casting or otherwise thinly spreading the liquid film formulation on a substrate, drying (e.g., evaporating) all or most of the solvent(s) from the film to produce a thin, semi-solid/solid film sheet of material, and cutting the film sheet into individual unit dosage forms for packaging or processing.

The oral dissolvable film of the present disclosure may be formed into a sheet prior to drying. After the desired components are combined to form a multi-component matrix, including the polymer, water, active other components as desired, the combination is formed into a sheet or film, by any method known in the art such as, coating, spreading, casting or drawing the multi-component matrix. A multi-layered film may be achieved by coating, spreading, or casting a combination onto an already formed film layer. Although a variety of different film-forming techniques may be used, it is desirable to select a method that will provide a flexible OF, such as reverse roll coating. The flexibility of the oral film allows for the sheets of oral film to be rolled and transported for storage or prior to being cut into individual dosage forms. Desirably, the oral film will also be self-supporting or in other words able to maintain their integrity and structure in the absence of a separate support. Furthermore, the films of the present invention may use selected materials that are edible or ingestible.

Coating or casting methods are particularly useful for the purpose of forming OF as disclosed herein. Specific examples include reverse roll coating, forward roll coating, gap or knife over roll coating, air knife coating, curtain coating, or combinations thereof, especially when a multi-layered film is desired.

Roll coating, or more specifically reverse roll coating, is particularly desired when forming films in accordance with the present disclosure. This procedure provides excellent control and uniformity of the resulting films, which is desired in the present disclosure. In this procedure, the coating material is measured onto the applicator roller by the precision setting of the gap between the upper metering roller and the application roller below it. The coating is transferred from the application roller to the substrate as it passes around the support roller adjacent to the application roller. Both three roll and four roll processes are common.

All references cited herein are incorporated by reference herein in their entirety.

The above description is considered that of the preferred embodiment(s) only. Modifications of these embodiments will occur by those skilled in the art and by those who make or use the illustrated embodiments. Therefore, it is understood that the embodiment(s) described above are merely exemplary and not intended to limit the scope of this disclosure, which is defined by the following claims as interpreted according to the principles of patent law, including the doctrine of equivalents.

The invention claimed is:

1. A method comprising orally administering to a subject an oral dissolvable film comprising:

(i) a flowable water-soluble or water-swellable film-forming matrix that includes at least one polymer, (ii) psilocybin, psilocin, baeocystin, or a combination thereof; and (iii) a stabilizing inorganic acid;

wherein, the psilocybin, psilocin, baeocystin, or combination thereof is present in a combined amount of 1 to 30 mg, wherein the ratio between psilocybin and psilocin to the inorganic acid is 1:0.5 to 1:2 w/w and wherein the surface pH of the film is between 2 and 4.5.

2. The method of claim 1 wherein the inorganic acid is phosphoric acid.

3. The method of claim 1, wherein the administering is for improving creativity, boosting physical energy level, attaining emotional balance, increasing performance on problem-solving tasks, treating anxiety, treating depression, treating addiction, or any combination thereof.

4. The method of claim 1, wherein the administering is for treating at least one of obsessive compulsive disorder (OCD), pain, irritability, fibromyalgia, post-traumatic stress disorder (PTSD), cluster headaches, paranoia, psychosis, anxiety, panic attacks, flashbacks, smoking addiction, alcohol addiction, and cocaine addiction.

5. The method of claim 1, wherein 1-5 oral dissolvable films are orally administered per day.

6. The method of claim 1, wherein the psilocybin, psilocin, baeocystin or combination thereof is delivered enterally, sublingually, or transmucosally.

7. The method of claim 1, wherein the oral dissolvable film comprises the psilocybin, psilocin, baeocystin, or combination thereof in a combined amount of 5 to 25 mg.

8. The method of claim 1, wherein the oral dissolvable film comprises the psilocybin, psilocin, baeocystin, or combination thereof in a combined amount of 10 to 20 mg.

9. The method of claim 1, wherein the flowable water-soluble or water swellable film-forming matrix that includes a polymer comprises each of plasticizer, binder, preservative, and solvent.

10. The method of claim 1, wherein the flowable water-soluble or water swellable film-forming matrix comprises less than 5 ppm of stabilizers that are not inorganic acids.

11. The method of claim 1, wherein the oral dissolvable film comprises less than 5 ppm of any of the following EDTA, BHT, propyl gallate, vitamin E or copper, sodium sulphite, sodium bisulphite, sodium thiosulphate, sodium formaldehyde sulfoxylate, sulphur dioxide, ascorbic acid, gallic acid, propyl gallate, isoascorbic acid, thioglycerol, thioglycolic acid, cysteine hydrochloride, acetylcysteine, butylated hydroxy toluene, butylated hydroxy anisole, alpha tocopherols, lecithin, ascorbyl palmitate or nordihydroguaiaretic acid or any derivative or combination thereof.

12. An oral dissolvable film comprising:

(a) plasticizer, (b) solvent, (c) sweetener, (d) flavoring agent, (e) binder, (t) inorganic acid, (g) preservative, and (h) psilocybin, psilocin, or combination thereof, wherein the ratio of inorganic acid to psilocin and psilocybin is 1:0.5 to 1:2 w/w wherein the surface pH of the film is between 2 and 4.5.

13. The oral dissolvable film of claim 12, wherein the inorganic acid is phosphoric acid.

14. An oral dissolvable film comprising:

(a) plasticizer selected from the group consisting of glycerol, glycerol monoacetate, diacetate or triacetate, triacetin, polysorbate, cetyl alcohol, propylene glycol, sorbitol, sodium diethylsulfosuccinate, triethyl citrate, and tributyl citrate, (b) solvent selected from the group consisting of water, ethanol, and combinations thereof, (c) sweetener, (d) flavoring agent, (e) binder selected from the group consisting of pectin, pullulan, starch, pregelatinized starch, gelatin, polyvinylpyrrolidone, methylcellulose, sodium carboxymethylcellulose, ethylcellulose, polyacrylamides, polyvinyloxoazolidone, and polyvinylalcohols, (f) acidifying agent selected from the group consisting of inorganic acids, (g) psilocybin, psilocin, or combination thereof, wherein the ratio between psilocybin and psilocin to the inorganic acid is 1:0.5 to 1:2 w/w, and wherein the surface pH of the film is between 2 and 4.5.

15. The oral dissolvable film of claim 14, which comprises less than 5 ppm of any of the following: EDTA, BHT, propyl gallate, vitamin E or copper, sodium sulphite, sodium bisulphite, sodium thiosulphate, sodium formaldehyde sulfoxylate, sulphur dioxide, ascorbic acid, gallic acid, propyl gallate, isoascorbic acid, thioglycerol, thioglycolic acid, cysteine hydrochloride, acetylcysteine, butylated hydroxy toluene, butylated hydroxy anisole, alpha tocopherols, lecithin, ascorbyl palmitate or nordihydroguaiaretic acid or any derivative or combination thereof.

16. The oral dissolvable film of claim 12, wherein the psilocybin, psilocin, or combination thereof, is in a combined amount of 5 to 25 mg.

17. The oral dissolvable film of claim 12, wherein the psilocybin, psilocin, or combination thereof, is suspended in an amorphous form within the oral dissolvable film.

18. The oral dissolvable film of claim 12, further comprising a barrier layer comprising at least one water-insoluble polymer.

* * * * *